(12) United States Patent
Rose

(10) Patent No.: US 8,166,753 B2
(45) Date of Patent: May 1, 2012

(54) ACCUMULATOR SYSTEM AND METHOD OF MONITORING SAME

(75) Inventor: Kenric B. Rose, Howell, MI (US)

(73) Assignee: Robert Bosch GmbH, Stuttgart (DE)

( * ) Notice: Subject to any disclaimer, the term of this patent is extended or adjusted under 35 U.S.C. 154(b) by 671 days.

(21) Appl. No.: 12/276,688

(22) Filed: Nov. 24, 2008

(65) Prior Publication Data

US 2010/0126161 A1    May 27, 2010

(51) Int. Cl.
*F15B 1/02* (2006.01)
*B60K 6/12* (2006.01)

(52) U.S. Cl. ............................... 60/418; 60/413; 60/414

(58) Field of Classification Search ................ 60/413, 60/414, 415, 418
See application file for complete search history.

(56) References Cited

U.S. PATENT DOCUMENTS

| | | |
|---|---|---|
| 3,665,788 A | 5/1972 | Nyman |
| 3,695,731 A | 10/1972 | England et al. |
| 3,917,027 A | 11/1975 | Hakanson et al. |
| 3,963,039 A * | 6/1976 | Coeurderoy ............... 60/413 |
| 4,064,694 A | 12/1977 | Baudoin |
| 4,098,144 A | 7/1978 | Besel et al. |
| 4,132,283 A | 1/1979 | McCurry |
| 4,199,950 A | 4/1980 | Hakanson et al. |
| 4,227,587 A | 10/1980 | Carman |
| 4,235,216 A | 11/1980 | Miles |
| 4,347,813 A | 9/1982 | Maucher et al. |
| 4,350,220 A | 9/1982 | Carman |
| 4,351,152 A | 9/1982 | Reynolds et al. |
| 4,373,332 A | 2/1983 | Holmen |
| 4,406,951 A | 9/1983 | Inoue |
| 4,441,573 A | 4/1984 | Carman et al. |
| 4,487,173 A | 12/1984 | Maucher et al. |
| 4,487,226 A | 12/1984 | Chun |
| 4,534,169 A | 8/1985 | Hunt |
| 4,543,923 A | 10/1985 | Hamano et al. |
| 4,580,534 A | 4/1986 | Blum et al. |
| 4,741,410 A | 5/1988 | Tunmore |
| 4,798,086 A | 1/1989 | Styfhoorn |
| 4,813,510 A | 3/1989 | Lexen |
| 5,088,041 A | 2/1992 | Tanaka et al. |
| 5,103,671 A | 4/1992 | Dyvig |

(Continued)

FOREIGN PATENT DOCUMENTS

DE    1228874    11/1966

(Continued)

OTHER PUBLICATIONS

Spirax Sarco, "Isolation Valves—Rotary Movement," 14 pages, printed from web site www.spiraxsarco.com on Jun. 10, 2008.

(Continued)

*Primary Examiner* — Thomas E Lazo
(74) *Attorney, Agent, or Firm* — Michael Best & Friedrich LLP

(57) ABSTRACT

An accumulator system includes an accumulator containing working fluid and gas, an isolation valve through which working fluid selectively flows to and from the accumulator, an actuator operably coupled to the isolation valve, and a passageway fluidly communicating the actuator with gas in the accumulator. The actuator maintains the isolation valve in an open configuration at a first gas pressure to allow working fluid to flow to and from the accumulator. The actuator also allows the isolation valve to close at a second gas pressure less than the first gas pressure.

21 Claims, 3 Drawing Sheets

U.S. PATENT DOCUMENTS

| | | |
|---|---|---|
| 5,152,142 A | 10/1992 | Budzich |
| 5,310,017 A | 5/1994 | Tobias |
| 5,404,717 A | 4/1995 | Nogi et al. |
| 5,492,189 A | 2/1996 | Kriegler |
| 5,507,144 A | 4/1996 | Gray, Jr. et al. |
| 5,823,281 A | 10/1998 | Yamaguchi et al. |
| 6,054,776 A | 4/2000 | Sumi |
| 6,135,913 A | 10/2000 | Lyon |
| 6,139,458 A | 10/2000 | Simmons |
| 6,170,587 B1 | 1/2001 | Bullock |
| 6,454,033 B1 | 9/2002 | Nathan et al. |
| 6,460,500 B1 | 10/2002 | Ooyana et al. |
| 6,481,329 B2 | 11/2002 | Porter |
| 6,543,311 B1 | 4/2003 | Baginski et al. |
| 6,615,786 B2 | 9/2003 | Mori et al. |
| 6,705,266 B2 | 3/2004 | Tachikawa et al. |
| 6,712,166 B2 | 3/2004 | Rush et al. |
| 6,719,080 B1 | 4/2004 | Gray, Jr. |
| 6,736,099 B2 | 5/2004 | Mori et al. |
| 6,962,050 B2 | 11/2005 | Hiraki et al. |
| 7,044,257 B2 | 5/2006 | Kempf et al. |
| 7,086,226 B2 | 8/2006 | Oguri |
| 7,100,371 B2 * | 9/2006 | Bitter et al. .................. 60/418 |
| 7,117,836 B2 | 10/2006 | Foster |
| 7,147,078 B2 | 12/2006 | Teslak et al. |
| 7,273,122 B2 | 9/2007 | Rose |
| 7,296,407 B2 | 11/2007 | Rose |
| 2002/0166530 A1 | 11/2002 | Tachikawa et al. |
| 2002/0166532 A1 | 11/2002 | Mori et al. |
| 2003/0000492 A1 | 1/2003 | Mori et al. |
| 2003/0103850 A1 | 6/2003 | Szulczewski |
| 2003/0173133 A1 | 9/2003 | Kempt et al. |
| 2005/0036894 A1 | 2/2005 | Oguri |
| 2006/0053790 A1 | 3/2006 | Foster |
| 2006/0068970 A1 | 3/2006 | Rose |
| 2006/0079375 A1 | 4/2006 | Marshall et al. |
| 2006/0157010 A1 | 7/2006 | Moriwaki et al. |
| 2007/0018499 A1 | 1/2007 | Kokubo et al. |
| 2007/0111849 A1 | 5/2007 | Ji |

FOREIGN PATENT DOCUMENTS

| | | |
|---|---|---|
| DE | 1627828 | 4/1970 |
| DE | 102007012130 | 11/2007 |
| DE | 102007032316 | 1/2009 |
| FR | 2467095 | 4/1981 |
| JP | 61042247 | 2/1986 |
| JP | 01035102 | 2/1989 |
| JP | 3262726 | 11/1991 |
| WO | 00/02743 | 1/2000 |
| WO | 02/095243 | 11/2002 |
| WO | 2004026607 | 4/2004 |
| WO | 2006055978 | 5/2006 |
| WO | 2007079642 | 7/2007 |
| WO | 2007/124882 | 11/2007 |
| WO | 2008/045468 | 4/2008 |

OTHER PUBLICATIONS

Spirax Sarco, "Control Valve Actuators and Positioners," 23 pages, printed from web site www.spiraxsarco.com on Jun. 10, 2008.

Bosch Rexroth Corporation, "Variable Displacement Pump Axial Piston—Swashplate Design," Model A4VSO specification sheet, 7 pages, admitted prior art, 2004.

Hewko, L. O., et al., "Hydraulic Energy Storage Based Hybrid Propulsion System for a Terrestrial Vehicle" research paper, Aug. 12, 1990, pp. 99-105.

European Search Report dated Dec. 20, 2011 for European Application No. 09013832.2, 7 pages.

* cited by examiner

ACCUMULATOR SYSTEM AND METHOD OF MONITORING SAME

FIELD OF THE INVENTION

The present invention relates to hybrid drive systems for vehicles and more particularly to hybrid hydraulic drive systems for vehicles.

BACKGROUND OF THE INVENTION

A typical vehicle hybrid hydraulic drive system uses a reversible pump/motor to absorb power from and add power to or assist a conventional vehicle drive system. The system absorbs power by pumping hydraulic fluid from a low pressure reservoir into a hydraulic energy storage system. This hydraulic energy storage system typically includes one or more nitrogen-charged hydraulic accumulators. Hybrid hydraulic drive systems typically add power to conventional vehicle drive systems by utilizing the hydraulic energy stored in the hydraulic accumulators to drive the reversible pump/motor as a motor.

SUMMARY OF THE INVENTION

The present invention provides, in one aspect, an accumulator system including an accumulator containing working fluid and gas, an isolation valve through which working fluid selectively flows to and from the accumulator, an actuator operably coupled to the isolation valve, and a passageway fluidly communicating the actuator with gas in the accumulator. The actuator maintains the isolation valve in an open configuration at a first gas pressure to allow working fluid to flow to and from the accumulator. The actuator also allows the isolation valve to close at a second gas pressure less than the first gas pressure.

The present invention provides, in another aspect, a method of monitoring a charge of an accumulator. The method includes providing an accumulator containing working fluid and gas, discharging working fluid from the accumulator through an isolation valve when the isolation valve is in an open configuration, fluidly communicating an actuator with gas in the accumulator, and maintaining the isolation valve in the open configuration, with the actuator, using the gas pressure in the accumulator.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
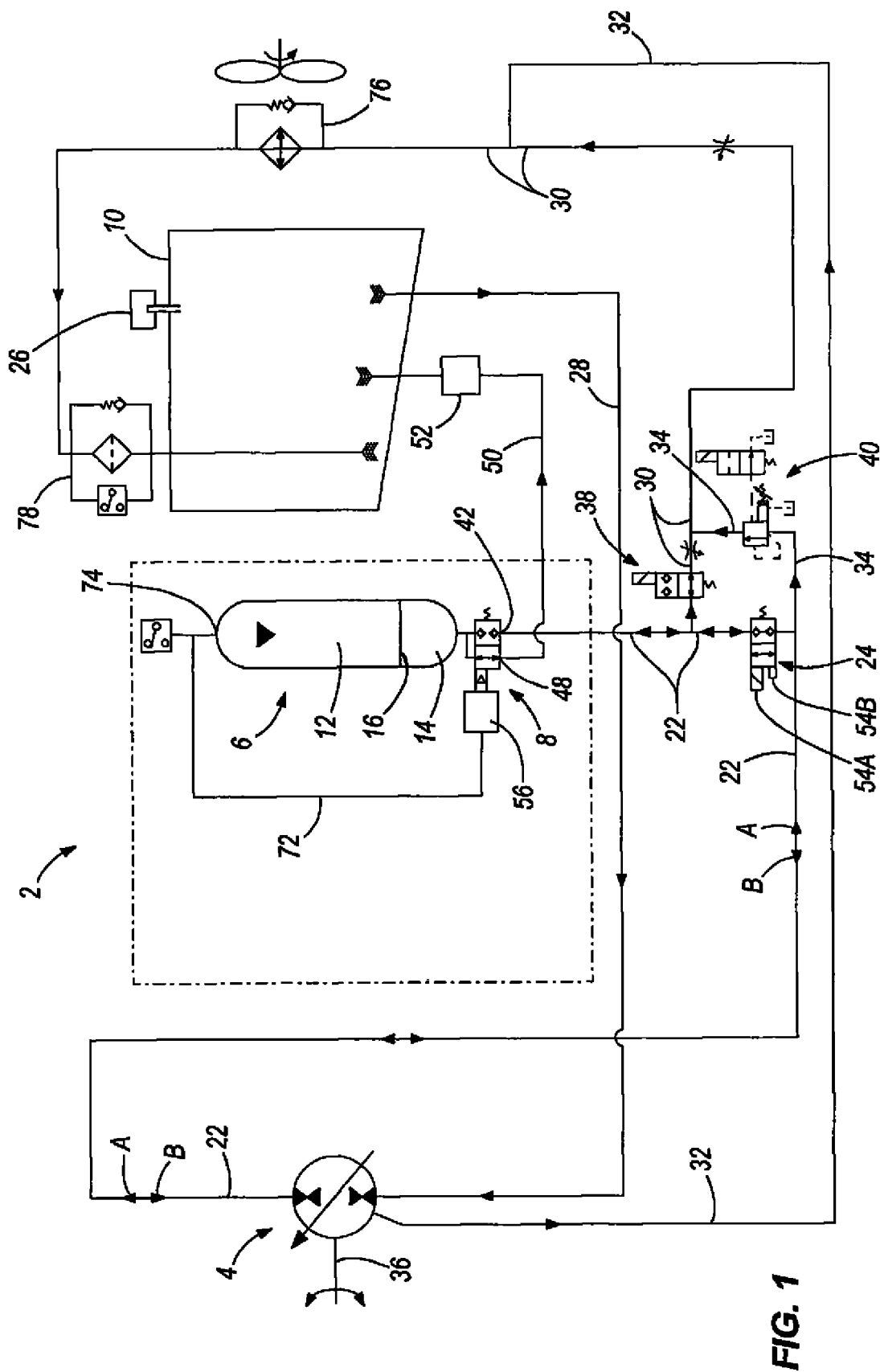
FIG. 1 is a schematic of an accumulator system of the present invention incorporated in a hybrid hydraulic drive system of a vehicle.

FIG. 1 illustrates a schematic of a vehicle hybrid hydraulic drive system including an accumulator system 2 and a reversible pump/motor 4 operably coupled to the accumulator system 2. The accumulator system 2 includes an accumulator 6, a first isolation valve 8 in fluid communication with the accumulator 6, and a reservoir 10. The accumulator 6 includes a first chamber 12 containing a gas (e.g. nitrogen, etc.), a second chamber 14 containing a working fluid (e.g. hydraulic fluid, etc.), and a movable piston 16 separating the chambers 12, 14 (schematically illustrated as a line between the chamber 12 and the chamber 14). Alternately, the accumulator 6 may be configured with a bladder or a diaphragm rather than the piston 16. The isolation valve 8 may be in fluid communication with the working fluid chamber 14 in the accumulator 6 by a fluid passageway. Alternately, the isolation valve 8 may be mounted directly to an inlet/outlet port of the accumulator 6. The isolation valve 8 is also in fluid communication with the reversible pump/motor 4 by fluid passageway 22. A second isolation valve 24 is in fluid communication with the isolation valve 8 and the reversible pump/motor 4 and is situated in the fluid passageway 22 between the isolation valve 8 and the reversible pump/motor 4.

With continued reference to FIG. 1, the reservoir 10 contains working fluid and includes a breather 26. The breather 26 provides venting of the space above the working fluid in the reservoir 10 as the level of working fluid fluctuates during operation of the accumulator system 2. In the illustrated construction of the accumulator system 2, the breather 26 is exposed to the atmosphere, such that gas in the reservoir 10 may be vented to the atmosphere, and replacement air may be allowed to enter the reservoir 10 when the level of working fluid in the reservoir 10 decreases. Alternately, the breather 26 may be fluidly connected to an auxiliary tank or vessel (not shown) to contain gas vented from the reservoir 10. The reservoir 10 is in fluid communication with the reversible pump/motor 4 by separate fluid passageways 22, 28, 30, 32, 34. A third isolation valve 38 is in fluid communication with the isolation valve 8 and the reservoir 10 and is situated in the fluid passageway 30 between the isolation valve 8 and the reservoir 10. In addition, a pressure relief valve 40 is in fluid communication with the reversible pump/motor 4 and the reservoir 10 and is situated in the fluid passageway 34 between the reversible pump/motor 4 and the reservoir 10. The reversible pump/motor 4 is operably coupled to a driveline 36 of a vehicle (not shown). Finally, a heat exchanger 76 and a working fluid filter 78 are in fluid communication with the reversible pump/motor 4 and the reservoir 10 and are situated in the fluid passageway 30 between the reversible pump/motor 4 and the reservoir 10.

Figure 2:
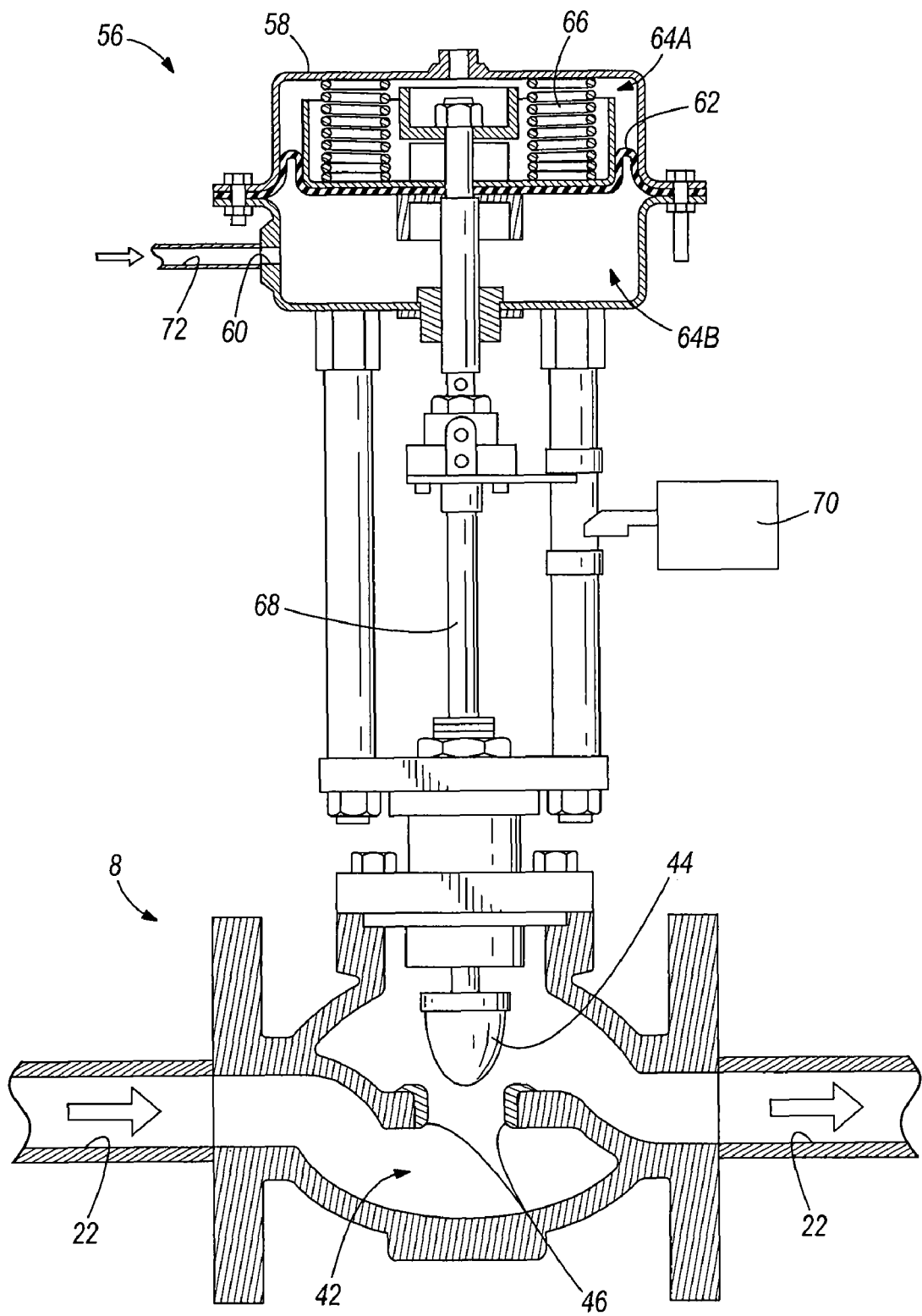
FIG. 2 is a cross-sectional view of an actuator and isolation valve of the system shown in FIG. 1, illustrating the isolation valve in an open configuration.
Figure 3:
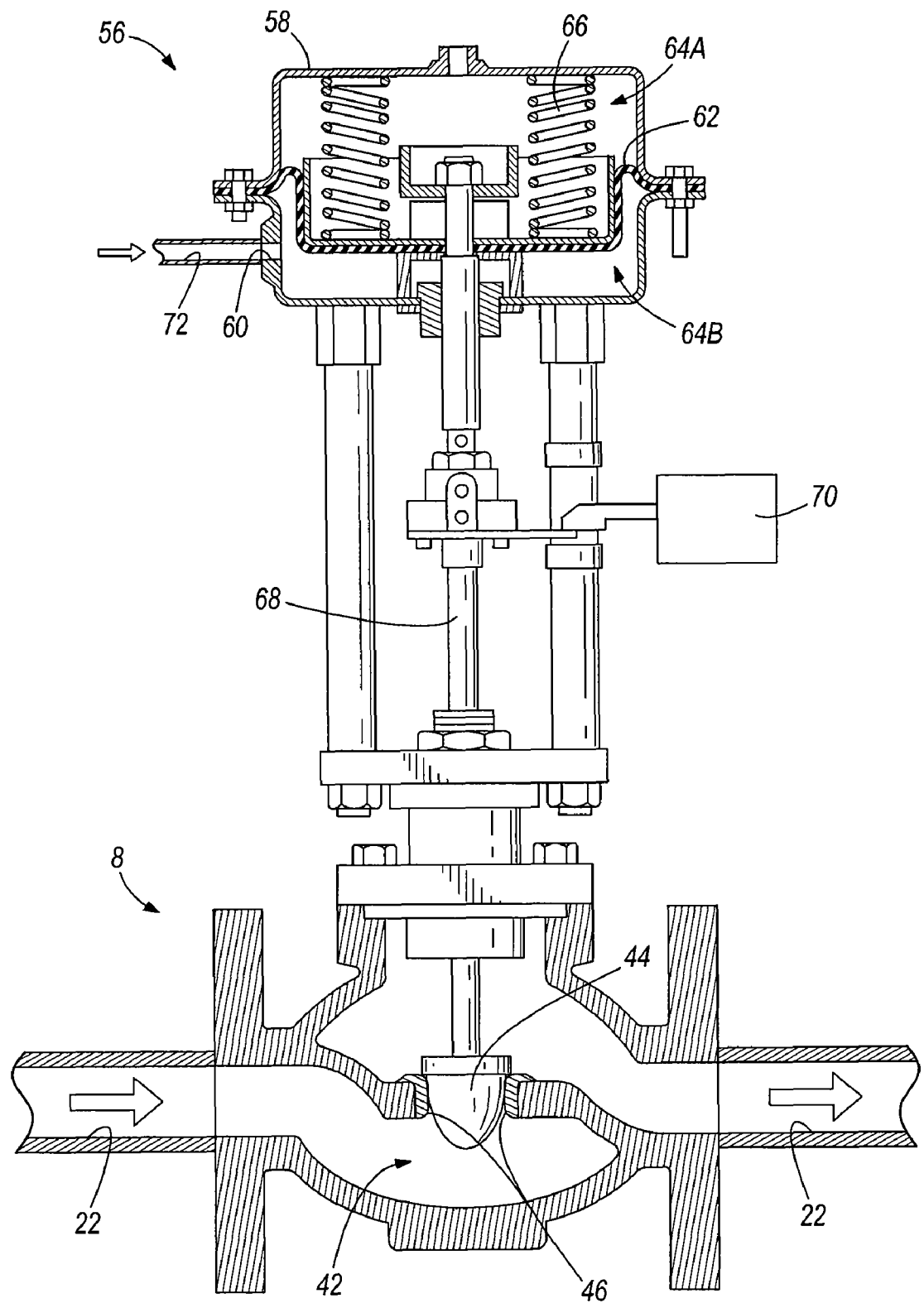
FIG. 3 is a cross-sectional view of the actuator and isolation valve of the system shown in FIG. 1, illustrating the isolation valve in a closed configuration.

With reference to FIGS. 2 and 3, the isolation valve 8 is configured as a poppet valve including a first flow path 42, a closure member 44 positioned in the first flow path 42 and operable to selectively engage a seat 46 to block the flow of working fluid through the first flow path 42 and the fluid passageway 22. Alternately, the isolation valve 8 may be configured as a different type of valve (e.g. a ball valve, spool valve, gate valve, cartridge valve, needle valve, block valve, etc.). With reference to FIG. 1, the isolation valve 8 also includes a second flow path 48 configured to open upon seating of the closure member 44 against the seat 46 to close the first flow path 42 through the isolation valve 8. As shown in FIG. 1, the second flow path 48 is in fluid communication with the reservoir 10 by a fluid passageway 50. A restrictor 52 is positioned in the fluid passageway 50 between the isolation valve 8 and the reservoir 10 to reduce the pressure and/or flow rate of the working fluid entering the reservoir 10. The isolation valve 8 may include any of a number of additional components (e.g. an additional closure member, etc.), or may be configured in any of a number of different ways to provide the second flow path 48 as schematically illustrated in FIG. 1.

The second isolation valve 24 may also be configured as a poppet valve like the isolation valve 8 shown in FIGS. 2 and 3. Alternately, the second isolation valve 24 may be a ball valve, spool valve, gate valve, cartridge valve, needle valve, block valve, etc. Like the isolation valve 8, the second isolation valve 24 includes a closure member (not shown) operable to selectively engage a seat (not shown) to block the flow of working fluid through the fluid passageway 22. Unlike the isolation valve 8, however, the second isolation valve 24 is biased to a closed position. A solenoid actuator 54A and a manual actuator 54B are operably coupled to the second isolation valve 24 to open the valve 24 in response to an electrical signal from an electronic control unit (not shown) and a manual actuation by an operator, respectively.

Again with reference to FIGS. 2 and 3, an actuator 56 is operably coupled to the isolation valve 8 and is configured to move the closure member 44 between the open and closed positions. Although shown as a separate and distinct component from the isolation valve 8 in FIGS. 2 and 3, the actuator 56 may alternatively be integrally formed with the isolation valve 8 to comprise a substantially unitary structure. The actuator 56 includes a housing 58 with a gas inlet 60, a diaphragm 62 separating the housing 58 into respective chambers 64A and 64B, one or more springs 66, and a shaft 68 coupling the diaphragm 62 to the closure member 44. A locking device 70 may also be used to maintain the shaft 68 and closure member 44 in the closed position (see FIG. 3). The locking device 70 may be incorporated as a component of the actuator 56, a component of the isolation valve 8, or as a separate and distinct component.

With reference to FIG. 1, the gas chamber 12 in the accumulator 6 is in fluid communication with the actuator 56 by a gas passageway 72. In the illustrated construction of the accumulator system 2, one end of the gas passageway 72 is fluidly connected to a gas pressure port 74 of the accumulator 6, and the other end of the gas passageway 72 is fluidly connected to the inlet 60 of the actuator housing 58. As a result, the gas pressure in the accumulator 6 and the chamber 64B is substantially equalized, and the gas pressure in the chamber 64B acts against the diaphragm 62 and the bias of the spring(s) 66 to maintain the closure member 44 in the open or unseated position.

Referring again to FIG. 1, when the vehicle (not shown) undergoes braking or another operation where driveline energy may be absorbed and stored, the reversible pump/motor 4 functions as a pump driven by the vehicle's axle or driveline 36. The reversible pump/motor 4 receives low pressure working fluid from the reservoir 10 through the fluid passageway 28 and pressurizes the working fluid. The resultant high pressure working fluid exits the reversible pump/motor 4 and flows through the fluid passageway 22 (in the direction of arrow A), through the isolation valves 24, 8, and into the working fluid chamber 14 of the accumulator 6. As the pressurized working fluid flows into the accumulator 6, the piston 16 is displaced upwardly, thereby compressing the gas in the accumulator 6. The work performed by the piston 16 to compress the gas is stored for later use to power the axle or driveline 36.

When the vehicle (not shown) undergoes acceleration or another operation where propulsion assistance is needed, the reversible pump/motor 4 functions as a motor. The compressed gas acts on the piston 16 in the accumulator 6, thereby maintaining the working fluid at a high pressure. Upon opening the second isolation valve 24, (to permit flow in the direction of arrow B) high pressure working fluid flows from the accumulator 6, through the fluid passageway 22, and into the reversible pump/motor 4 to drive the reversible pump/motor 4 and the driveline 36, thereby assisting the vehicle's acceleration or other energy-expending operation. Low pressure working fluid exits the reversible pump/motor 4, flows through the working fluid passageways 32, 30, through the heat exchanger 76 and the filter 78 positioned in the fluid passageway 30, and is subsequently returned to the reservoir 10.

As shown in FIG. 2, during normal operation of the accumulator system 2, high pressure gas from the accumulator 6 acts on the diaphragm 62 to compress the spring(s) 66 and maintain the shaft 68 and closure member 44 in an open configuration allowing working fluid to flow through the first flow path 42 of the isolation valve 8, and subsequently through the fluid passageway 22. Flow of working fluid through the second flow path 48 is blocked while the first flow path 42 is open. The spring rate of the spring(s) 66 is sized to allow the closure member 44 to be displaced from the seat 46 when the pressure of the gas in the chamber 64B and the accumulator 6 is equal to or greater than a predetermined minimum value indicative of normal operation of the accumulator 6.

The second isolation valve 24 is actuatable to disconnect the accumulator 6 from the reversible pump/motor 4 to maintain pressure within the accumulator 6 until high pressure working fluid is needed to drive the reversible pump/motor 4 or until additional high pressure working fluid is to be stored in the accumulator 6. The third isolation valve 38 is actuatable to connect the accumulator 6 to the reservoir 10 to vent high pressure working fluid from the accumulator 6 into the reservoir 10 through the fluid passageways 22, 30. The pressure relief valve 40 allows working fluid to vent from the reversible pump/motor 4 into the reservoir 10 through fluid passageways 22, 34, 30 when the pressure of working fluid rises above a predetermined level.

Should the accumulator 6 fail (e.g. by leakage of gas past the piston 16 and into the working fluid, or by failure of the bladder in a bladder accumulator), the gas pressure in the accumulator 6 will drop below the predetermined minimum value and the spring 66 will overcome the gas pressure acting on the diaphragm 62 in the actuator 56 to downwardly displace the shaft 68 and closure member 44 to close the first flow path 42 and fluid passageway 22, thereby preventing working fluid from flowing to and from the accumulator 6. As the first flow path 42 closes, the second flow path 48 opens allowing working fluid and gas to vent from the accumulator 6 into the reservoir 10 via the fluid passageway 50. The restrictor 52 provides controlled venting of the working fluid from the accumulator 6, such that a rapid transfer of working fluid from the accumulator 6 to the reservoir 10 is substantially prevented. Gas in the reservoir 10 is subsequently vented to the atmosphere or another vessel (not shown) through the breather 26. After the first flow path 42 in the isolation valve 8 is closed, the locking device 70 is engaged to maintain the closure member 44 in the closed position as shown in FIG. 3. Alternately, the isolation valve 8 may be configured with only the single flow path 42, thereby preventing gas from escaping the failed accumulator 6.

The accumulator system 2 may also include a warning indicator to signal failure of the accumulator 6. If the accumulator 6 is one of several parallel accumulators in the system 2, the warning indicator may serve as a signal to repair or replace the failed accumulator 6. The locking device 70 may be operable to provide such a warning signal after the first flow path 42 in the isolation valve 8 is closed. For example, the locking device 70 may provide an electrical signal to a fault-detection system to indicate that the first flow path 42 in the isolation valve 8 is closed and that the accumulator 6 has failed. Alternatively, the locking device 70 may provide an external signal (e.g., a mechanical indicator or flag that is tripped upon closure of the first flow path 42 in the isolation valve 8) to indicate failure of the accumulator 6.

Various features of the invention are set forth in the following claims.

What is claimed is:

1. An accumulator system comprising:
    an accumulator containing working fluid and gas;
    an isolation valve through which working fluid selectively flows to and from the accumulator;
    an actuator operably coupled to the isolation valve; and
    a passageway fluidly communicating the actuator with gas in the accumulator;
    wherein the actuator maintains the isolation valve in an open configuration at a first gas pressure to allow working fluid to flow to and from the accumulator, and wherein the actuator allows the isolation valve to close at a second gas pressure less than the first gas pressure.

2. The accumulator system of claim 1, wherein the isolation valve includes
    a flow path through which working fluid selectively flows; and
    a closure member at least partially positioned within the flow path.

3. The accumulator system of claim 2, further comprising a reservoir containing working fluid, wherein the isolation valve includes a second flow path to vent working fluid and gas from the accumulator to the reservoir in response to the closure member closing the first flow path in the isolation valve.

4. The accumulator system of claim 3, further comprising a restrictor in fluid communication with the isolation valve and the reservoir, wherein working fluid and gas discharged through the second flow path of the valve pass through the restrictor.

5. The accumulator system of claim 4, further comprising a breather coupled to the reservoir.

6. The accumulator system of claim 2, wherein one of the actuator and the isolation valve includes a resilient member operable to bias the closure member to close the flow path.

7. The accumulator system of claim 6, wherein one of the actuator and the isolation valve includes a shaft coupling the closure member and the resilient member.

8. The accumulator system of claim 7, wherein one of the actuator and the isolation valve includes a diaphragm coupling the resilient member and the shaft.

9. The accumulator system of claim 6, wherein the actuator includes a housing and a diaphragm separating the housing into a first chamber and a second chamber, wherein the resilient member is positioned in the first chamber, and wherein the second chamber is in fluid communication with the accumulator to allow gas from the accumulator to fill the second chamber.

10. The accumulator system of claim 1, wherein the isolation valve is one of a ball valve, spool valve, gate valve, cartridge valve, needle valve, block valve, and a poppet valve.

11. The accumulator system of claim 1, further comprising a locking device that maintains the isolation valve closed after gas in the accumulator reaches the second gas pressure.

12. The accumulator system of claim 11, wherein the locking device is operable to provide a signal indicative of accumulator failure when the isolation valve is closed.

13. The accumulator system of claim 1, wherein the accumulator system is part of a hybrid hydraulic drive system of a vehicle including a reservoir containing working fluid and a reversible pump/motor in fluid communication with the reservoir, and wherein the accumulator is in selective fluid communication with the reversible pump/motor to deliver pressurized working fluid to the reversible pump/motor when operating as a motor, and to receive pressurized fluid discharged by the reversible pump/motor when operating as a pump.

14. A method of monitoring a charge of an accumulator, the method comprising:
    providing an accumulator containing working fluid and gas;
    discharging working fluid from the accumulator through an isolation valve when the isolation valve is in an open configuration;
    fluidly communicating an actuator with gas in the accumulator; and
    maintaining the isolation valve in the open configuration, with the actuator, using the gas pressure in the accumulator.

15. The method of claim 14, further comprising biasing the isolation valve to a closed configuration.

16. The method of claim 14, further comprising:
    predetermining a gas pressure value indicative of a failure in the accumulator; and
    closing the isolation valve when the gas pressure in the accumulator is less than the predetermined gas pressure value.

17. The method of claim 16, wherein closing the isolation valve includes closing a first flow path through the isolation valve, and wherein the method further includes discharging working fluid and gas through a second flow path in the isolation valve.

18. The method of claim 17, further comprising restricting discharge of working fluid and gas from the second flow path in the isolation valve to a reservoir.

19. The method of claim 18, further comprising venting gas from the reservoir.

20. The method of claim 16, further comprising locking the isolation valve after the isolation valve is closed.

21. The method of claim 16, wherein closing the isolation valve includes overcoming the gas pressure in the accumulator with a biasing member of the actuator.

* * * * *